(12) United States Patent
Lazier

(10) Patent No.: US 11,409,458 B2
(45) Date of Patent: *Aug. 9, 2022

(54) MIGRATION OF INFORMATION VIA STORAGE DEVICES

(71) Applicant: Amazon Technologies, Inc., Seattle, WA (US)

(72) Inventor: Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,709

(22) Filed: Aug. 20, 2020

(65) Prior Publication Data

US 2020/0379651 A1 Dec. 3, 2020

Related U.S. Application Data

(63) Continuation of application No. 15/473,475, filed on Mar. 29, 2017, now Pat. No. 10,768,849.

(51) Int. Cl.
*G06F 3/06* (2006.01)

(52) U.S. Cl.
CPC .............. *G06F 3/065* (2013.01); *G06F 3/067* (2013.01); *G06F 3/0613* (2013.01);
(Continued)

(58) Field of Classification Search
CPC .... G06Q 10/083; G06Q 10/08; G06F 3/0622; G06F 3/0619; G06F 3/065; G06F 3/0647; G06F 3/0683; G06F 3/0659
See application file for complete search history.

(56) References Cited

U.S. PATENT DOCUMENTS 6,125,388 A 9/2000 Reisman
8,261,033 B1 9/2012 Slik et al.
(Continued)

FOREIGN PATENT DOCUMENTS

| CN | 1991855 A | 7/2007 |
| CN | 1996871 A | 7/2007 |
| CN | 103902410 A | 7/2014 |

OTHER PUBLICATIONS

Chinese First Office Action dated Sep. 3, 2021, Patent Application No. 201880028063.4, 9 pages.
(Continued)

*Primary Examiner* — Reginald G Bragdon
*Assistant Examiner* — Curtis James Kortman
(74) *Attorney, Agent, or Firm* — Davis Wright Tremaine LLP

(57) ABSTRACT

A device such as a network-attachable data transfer device may be configured to operate in a cluster to coordinate the storage of data. A first manifest may be generated inventorying a first set of data successfully transferred to the data transfer device from a data source. A second manifest may be generated inventorying a second set of data successfully transferred from the data transfer device to a data destination. The first manifest may be compared with the second manifest to determine a transfer status of one or more data objects. The transfer status may indicate one or more data objects successfully transferred to the data destination from the data source. The one or more objects may be processed according to the transfer status.

20 Claims, 10 Drawing Sheets

(52) U.S. Cl.
CPC .......... *G06F 3/0619* (2013.01); *G06F 3/0623* (2013.01); *G06F 3/0647* (2013.01)

(56) References Cited

U.S. PATENT DOCUMENTS

| | | | |
|---|---|---|---|
| 8,554,735 | B1 | 10/2013 | Wible et al. |
| 8,782,441 | B1 | 7/2014 | Osterwalder et al. |
| 8,949,401 | B2 | 2/2015 | Haze et al. |
| 9,225,780 | B2 | 12/2015 | Braam et al. |
| 9,270,683 | B2* | 2/2016 | Coughlin ............... H04L 9/3268 |
| 9,448,614 | B2 | 9/2016 | Slik |
| 9,448,893 | B1 | 9/2016 | Whitehead et al. |
| 2002/0144148 | A1 | 10/2002 | Hashem et al. |
| 2003/0131291 | A1 | 7/2003 | Morrison et al. |
| 2004/0073846 | A1* | 4/2004 | Nakanishi ............... G06F 21/64 714/42 |
| 2007/0005992 | A1 | 1/2007 | Schluessler et al. |
| 2007/0244817 | A1 | 10/2007 | Dolivo et al. |
| 2009/0281836 | A1 | 11/2009 | Velarde |
| 2010/0257140 | A1* | 10/2010 | Davis ................... G06F 16/113 707/661 |
| 2010/0293383 | A1 | 11/2010 | Coughlin et al. |
| 2010/0306267 | A1* | 12/2010 | Zamkoff ............. G06F 11/1464 707/783 |
| 2012/0137001 | A1 | 5/2012 | Ferris et al. |
| 2012/0151049 | A1 | 6/2012 | Carlson |
| 2014/0164516 | A1 | 6/2014 | Maltbie et al. |
| 2014/0176997 | A1* | 6/2014 | Adachi ................. G06F 3/1212 358/1.15 |
| 2014/0181016 | A1 | 6/2014 | Whitehead et al. |
| 2015/0161184 | A1 | 6/2015 | Patiejunas et al. |
| 2015/0227536 | A1 | 8/2015 | Montulli et al. |
| 2015/0324281 | A1* | 11/2015 | Takefman ........... G06F 12/0246 711/103 |
| 2015/0350316 | A1 | 12/2015 | Calder et al. |
| 2015/0373086 | A1* | 12/2015 | Hunt ...................... H04L 67/10 709/201 |
| 2016/0357951 | A1 | 12/2016 | Fasoli et al. |
| 2017/0177449 | A1 | 6/2017 | Bronk |
| 2017/0322794 | A1 | 11/2017 | Ferlitsch et al. |
| 2018/0011914 | A1 | 1/2018 | Doherty et al. |
| 2018/0077219 | A1 | 3/2018 | Tan et al. |

OTHER PUBLICATIONS

International Search Report and Written Opinion dated Jun. 14, 2018, International Patent Application No. PCT/US2018/024092, filed Mar. 23, 2018, 14 pages.

European Communication pursuant to Article 94(3) EPC dated Dec. 10, 2021, Patent Application Mo 18717482.6, 9 pages.

* cited by examiner

Manifest 400

| Data Object ID | Integrity Information | Metadata | Transfer Status |
|---|---|---|---|
| ⋮ | ⋮ | ⋮ | ⋮ |
| 001 | a2191be9f7f4cb62 | $T_1$; $Loc_1$; $Size_1$ | Successful |
| 002 | bbc7dcdf8dab3387 | $T_2$; $Loc_2$; $Size_2$ | Successful |
| 003 | 2cde26abb014c1ce | $T_3$; $Loc_3$; $Size_3$ | Successful |
| ⋮ | ⋮ | ⋮ | ⋮ |
| N-2 | 6ec20e011fc83930 | $T_{N-2}$; $Loc_{N-2}$; $Size_{N-2}$ | Unsuccessful |
| N-1 | 978f6d086e9bde91 | $T_{N-1}$; $Loc_{N-1}$; $Size_{N-1}$ | Successful |
| N | acf1817c0f252031 | $T_N$; $Loc_N$; $Size_N$ | Unsuccessful |
| ⋮ | ⋮ | ⋮ | ⋮ |

402 — Data Object ID
404 — Integrity Information
406 — Metadata
408 — Transfer Status

 410A

 410B

FIG. 4

MIGRATION OF INFORMATION VIA STORAGE DEVICES

CROSS-REFERENCE TO RELATED APPLICATION

This application is a continuation of U.S. patent application Ser. No. 15/473,475, filed Mar. 29, 2017, entitled "MIGRATION OF INFORMATION VIA STORAGE DEVICES," the disclosure of which is incorporated herein by reference in its entirety.

BACKGROUND

Growth of data storage capacity and demands of data users has far outpaced network data transmission bandwidth. Large-scale data sets (e.g., "big data"), for instance, may comprise collections of data so massive or complex that traditional data transfer solutions are incapable of efficiently or effectively transferring them. The process of moving large-scale data sets from a source destination onto a data storage system can consume considerable resources and/or involve risk. The size of a data set, for example, may be such that the transfer of data over a network is impractical. Further, due to the size or complexity of the data sets, it may be difficult to determine whether the entire data set has been successfully transferred or copied from the source location onto the data storage system. Determining whether the data set has been successfully transferred to the data storage location at the end destination may also be challenging, especially when data is transferred in ways that avoid any computer networks for at least part of the transfer.

BRIEF DESCRIPTION OF THE DRAWINGS

Various techniques will be described with reference to the drawings, in which:

FIG. 4 shows an illustrative example of a data transfer manifest in accordance with various embodiments;

DETAILED DESCRIPTION

Figure 1:
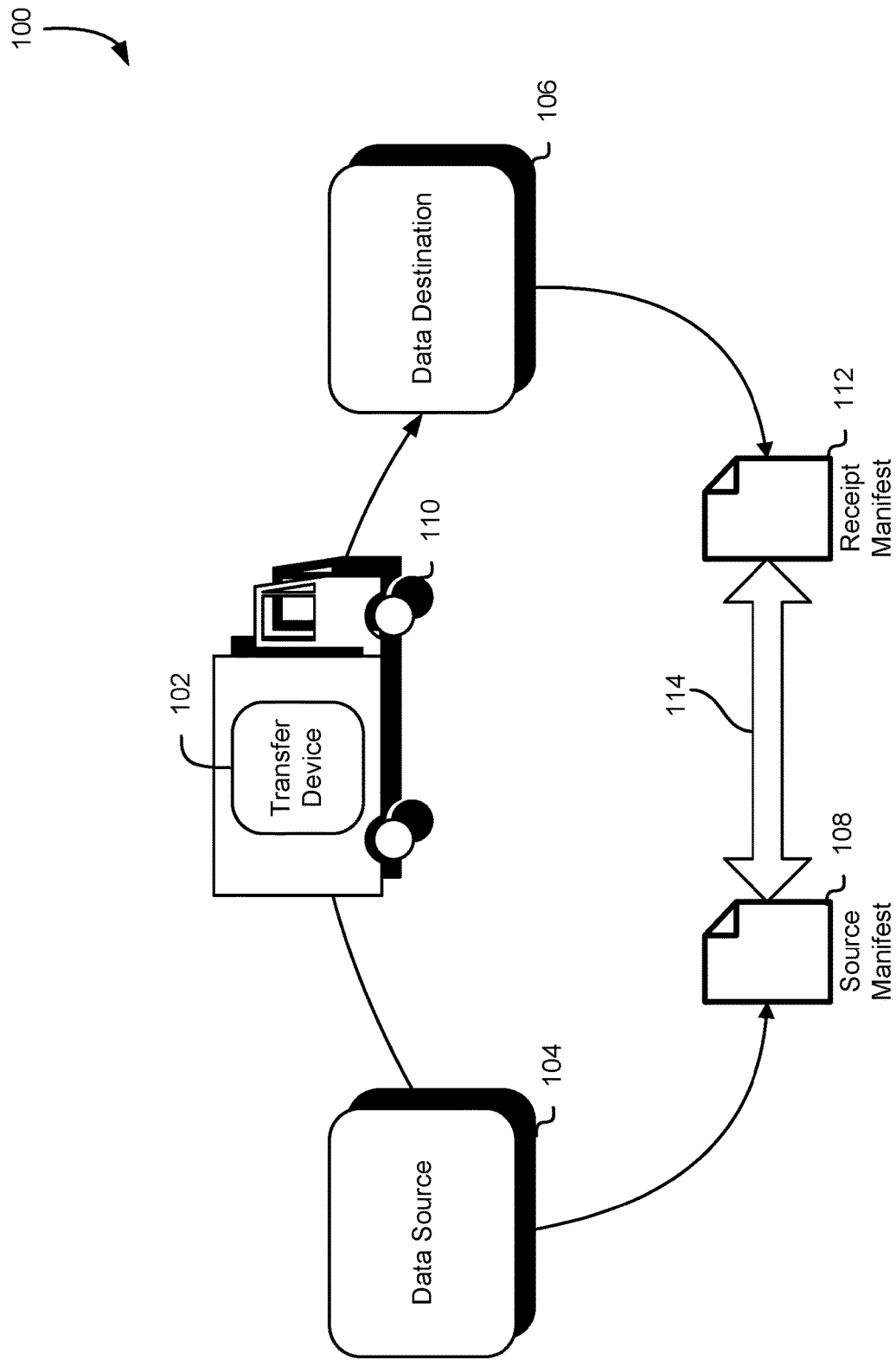
FIG. 1 shows an environment in which various embodiments may be practiced.

Techniques described and suggested herein relate to utilizing network-attachable data transfer devices (which may be configured in a cluster) for physically transporting large-scale data sets from one location to another. In one example, a network-attachable cluster of network attachable data transfer devices may be configured so that the devices communicate with and transfer data among one another. A cluster of devices may refer to a plurality of devices that are configured to operate together, such as operating in concert to store data. For example, a cluster of devices may be used to provide expanded data storage and/or processing capabilities beyond what a single storage device is capable of providing and/or to provide durability by storing multiple copies and/or by storing using redundancy (e.g., erasure) coding. Data and metadata relating to operation of a cluster may be distributed among the cluster devices. Devices described herein may be network-attachable data transfer devices.

As noted, various implementations may be used to transport large-scale data sets from a client to a service provider. The data sets may be uploaded to one or more services of the service provider such that the data sets are easily accessible by the client. The availability of the large-scale data sets via the service provider potentially releases the client from the cost and burden of maintaining and storing the large-scale data sets. Accordingly, the client may wish to delete or remove the large-scale data sets from their data storage systems. However, deleting large-scale data sets from the client's data storage systems may risk permanent loss of some or all of the data sets. For instance, in the event that the data sets are not fully or accurately copied to the data transfer device transported to the service provider, or the data sets are not fully or accurately copied to the data storage system of the service provider from the data transfer device, deletion of the data sets in the client data storage system would result in a permanent loss of at least some of the data sets. Moreover, it may be unduly burdensome to review the entirety of the large-scale data sets at the service provider to ensure that the data sets were successfully transferred thereto. This is especially true where the client system and the service provider are connected to different networks incapable of communicating with each other.

To safely transfer data from one location to another, various implementations involve inventorying data that is successfully transferred to or from one of the data transfer devices in the network-attachable cluster of network attachable data transfer devices. In connection with copying the large-scale data sets to the data transfer device from the device cluster, for example, a source manifest may be generated inventorying data objects of the data sets that are successfully transferred to the data transfer device. When the data transfer device is at the service provider, a computer system of the service provider may generate a receipt manifest to inventory data objects that are successfully uploaded to a service of the service provider from the data transfer device. A comparison may be performed between the source manifest and the receipt manifest to determine a set of data objects of the large-scale data set were successfully copied both (1) to the data transfer device from the client data storage system, and (2) to the service provider from the data transfer device. The client may safely process the corresponding set of data objects on the client data storage system in any suitable manner, such as by deleting the set of data objects from the data storage system. Conversely, the client may maintain the integrity of or protect any data objects not indicated to be successfully copied to the service provider. Accordingly, the risk of erroneously deleting data objects at the source due to unsuccessful copy of the data objects may be substantially reduced.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of an environment 100 in which various embodiments of the present disclosure can be practiced. In an embodiment, a data transfer operation is performed to copy a data set comprising a set of data objects onto a network-attachable data storage and transfer device 102 for receiving and physically transporting the data set from a data source 104 to a data destination 106. A data-inventorying operation may be performed to generate a source manifest 108 inventorying data objects of the data set successfully copied onto the data transfer device 102. After the data transfer operation is performed, the transfer device 102 may be physically transported from the data source 104 to the data destination 106 using one or more transportation methods 108 such as a shipping service employing one or more vehicles including trucks, cars, bicycles, airplanes, or helicopters, by way of non-limiting example.

When the transfer device 102 arrives at the data destination 106, a data transfer operation may be performed on the transfer device 102. The data transfer operation includes an attempt to copy the data objects of data set from the data transfer device 102 onto one or more data storage devices of the data destination 106. A data-inventorying operation may be performed to generate a receipt manifest 112 inventorying the data objects of the data set on the data transfer device 102 successfully copied to the data destination 106. A data storage service of the data source 104 may perform an operation 114 comparing the source manifest 106 and the receipt manifest 112 to determine a set of data objects that were successfully transferred from the data source 104 to the data destination 106. The operation 114 may include determining data objects inventoried on the source manifest 108 that correspond to data objects inventoried on the receipt manifest 112. A result of the comparison operation 114 may provide an indication of data objects that can be safely processed without risking of permanent loss of data. The data storage service may operate in accordance with an automated process for reading data objects from the data transfer device 102, transfer to the destination 106, and updating the receipt manifest 112 accordingly, such as described below.

Based on the comparison operation 114, a set of operations may be performed for processing one or more data objects indicated as successfully transferred. In one embodiment, a delete operation may be performed for a set of data objects indicated as being successfully transferred on from the data source 104 onto the transfer device 102, and from the transfer device 102 to the data destination 106, as described below with respect to FIG. 5.

Figure 2:
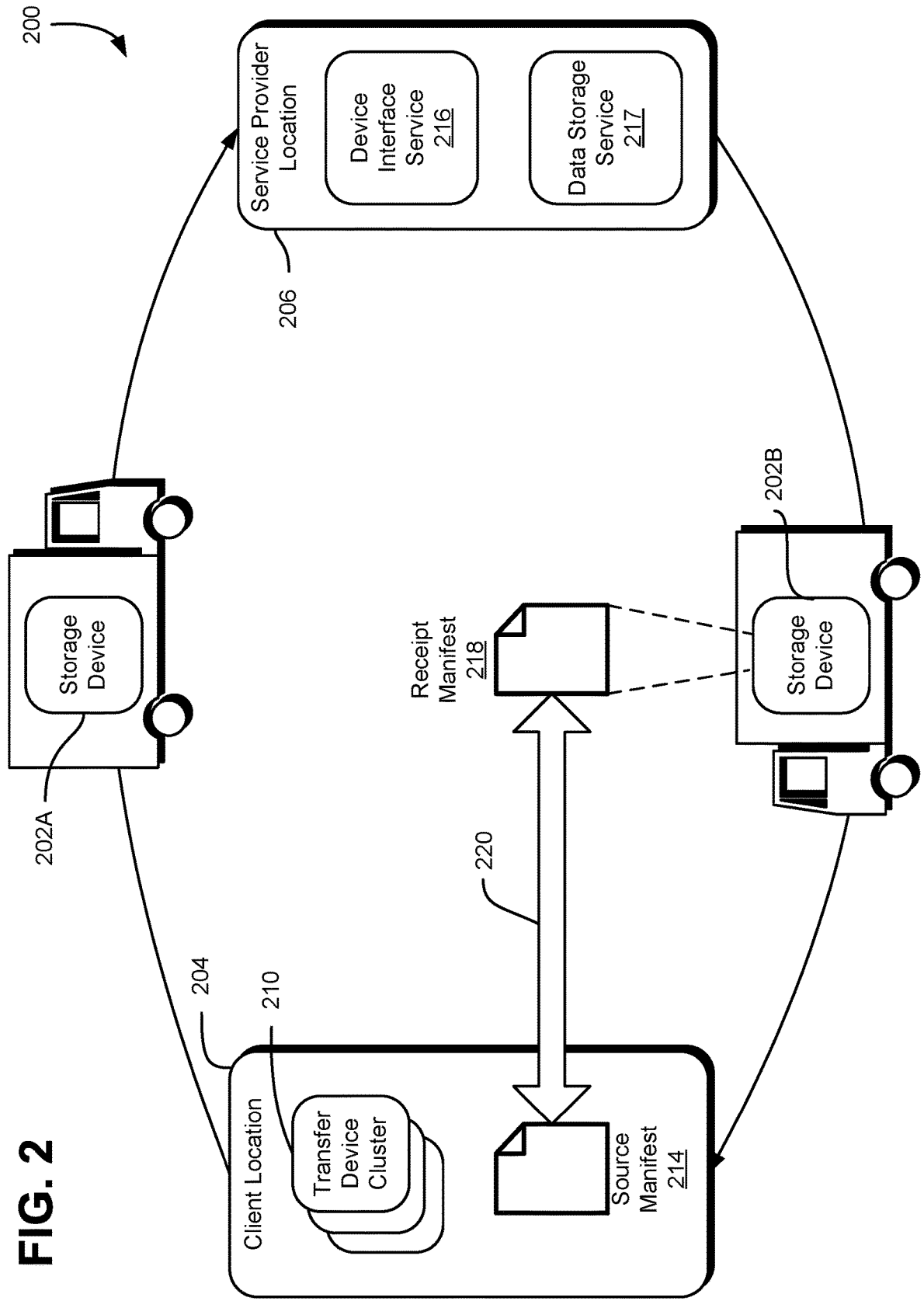
FIG. 2 shows an illustrative example of an environment in which various embodiments may be practiced.

FIG. 2 is an illustrative example of an environment 200 in which various embodiments of the present disclosure can be practiced. The environment 200 may be, for instance, the environment 100 described above in connection with FIG. 1. A network-attachable data transfer device 202A (e.g., transfer device 102) is processed at a client location 204 and transported to a service provider location 206. The transfer device 202A is processed at the service provider location 206, and the processed data transfer device 202B may be transported back to the client location 204. A network connection between the client location 204 and the service provider location 206 may have insufficient bandwidth or complexity to efficiently, effectively, and/or practically transfer large-scale data objects in this instance. Accordingly, a network gap 208 may exist between the client location 204 and the service provider location 206. In some embodiments, however, a network connection between the client location 204 and the service provider location 206 may be capable of transferring other data objects and communications, such as email, documents and media files.

At the client location 204, a cluster of network-connected data transfer devices 210 communicate with and transfer between data each other over a network. A cluster of network-attachable data transfer devices may refer to a plurality of network-attachable data transfer devices that are configured to operate together. For example, a cluster 210 may be used to provide expanded data storage and/or processing capabilities beyond what a single device is capable of providing and/or to increase data durability by allowing the recovery of data in the event of a failure of a device. Individual network-attachable data transfer devices may be configured to operate individually (e.g., without coordination with other devices) or may be configured to operate as a cluster (e.g., through coordinating storage of data and metadata in a structured manner between multiple devices of a cluster). When configured to operate as a cluster, data and metadata may be distributed between devices in a cluster. One or more of the devices in the storage device cluster 210 may be identical to the data transfer device 202, described in detail below with respect to FIG. 3. A cluster service of the cluster 210 may be utilized to perform various operations associated with the cluster 210, such as performing data transfer operations.

In some embodiments, a customer may receive a network-attachable data transfer device and begin using the network-attachable data transfer device individually (i.e., not in a clustered mode of operation). The customer may determine, for various reasons, that an individual network-attachable data transfer device is appropriate under the circumstances—for example, the customer may determine that the data storage capacity of a single network-attachable data transfer device is sufficient for the expected use case or that under certain non-technical constraints (e.g., lack of money to order additional network-attachable data transfer devices) a network-attachable data transfer device is sufficient for the customer's needs. The customer may begin to transfer and/or collect data on the network-attachable data transfer device operating individually. At a later point in time, the customer may determine that it is appropriate to use additional network-attachable data transfer devices—for example, the data storage capacity needed for the use case exceeds the expected storage needs as well as the data storage capacity of a single network-attachable data transfer device. A customer may acquire additional network-attachable data transfer devices and provision the network-attachable data transfer devices (including the initial network-attachable data transfer device) to operate in a cluster mode while still retaining the data and analysis previously performed by the initial network-attachable data transfer device in a single-device mode of operation (i.e., operating individually as opposed to as part of a cluster).

It should be noted that in some embodiments a network-attachable data transfer device is a member of multiple clusters. For example, a network-attachable data transfer device such as the network-attachable transfer device 202 shown in FIG. 2 can be part of the cluster 210 and ingest data as part of the cluster (e.g., in a first data storage partition) and simultaneously be part of a second cluster (not illustrated in FIG. 2) that includes a second set of network-attachable data transfer devices. Network-attachable data transfer devices and/or clusters may have configuration data related to the use of a device in multiple clusters. For example, a network-attachable data transfer device may be configured such that it allows or prohibits the particular device to join or be a member of multiple clusters. Likewise, a cluster may be configured (e.g., via metadata stored in the cluster manifest) to allow or prohibit devices of the particular cluster to join or be a member of another cluster. In some embodiments, a network-attachable data transfer device is configured such that, as part of joining a cluster such as the cluster 210 illustrated in FIG. 2, the network-attachable data transfer device is provisioned for use on the cluster. The provisioning of the device for use on the cluster may include erasing, deleting, reformatting, resetting, or performing other operations such that traces of previous usages of the device (e.g., programs, applications, data) from a previous use are removed.

In some embodiments, a client may interact with a cluster service of a service provider to persistently store a plurality of data objects on the cluster 210. The cluster service may be a computer system configured (e.g., with executable instructions) to manage data on the cluster, such as by orchestrating which devices in the cluster store which data, ensuring data durability (e.g., by using erasure or other redundancy coding and storing different data shards on different devices in the cluster), copying data onto a network-attachable data transfer device designated for physical transfer of data from one location to another, and the like. The cluster service may operate on a network-attachable transfer device 202 or a separate computer system with connectivity to one or more network-attachable transfer devices. The plurality of data objects may be ingested into the cluster 210 from a data storage location 212, such as a server, at the client location 204. However, the plurality of data objects may be transferred to the cluster 210 from an external data source in other embodiments.

To transfer the plurality data objects from the cluster 210 to the service provider location 206, the client may connect the transfer device 202A to the cluster 210 and join the transfer device 202A as a member of the cluster network. The transfer device 202A may be a member of the cluster selected for shipment of the plurality of data objects, or may be a data transfer device separate from the cluster that is used to physically transport data objects. The data transfer devices are generally reusable devices that may be repeatedly transported back and forth between a service provider entity and a client/customer entity. The transfer device 202A may include an operating system that controls various aspects of the device, such as the transfer device service described herein. Each device in the cluster 210 may be provided with a similar operating system such that the devices in the cluster 210 collectively operate to store, encrypt, transfer, or otherwise handle data. The client may select the plurality of data objects and initiate a data transfer operation that copies the plurality of objects from the cluster 210 to the transfer device 202A. A source manifest 214 may be generated inventorying a set of data objects of the plurality of data objects that were successfully copied onto the transfer device 202A from the cluster 210. The source manifest 214 may comprise information regarding the data transfer operation, such as data object identifiers identifying the set of data objects successfully copied to the transfer device 202A, as described below with respect to FIG. 4. The source manifest 214 may serve as a record of any data objects unsuccessfully transferred to the transfer device 202A. The source manifest 214 may be a static object whose entries (as shown in FIG. 4) are not modified after being finalized. For example, the information regarding the data transfer operation in the source manifest 214 may be designated as read-only after the transfer operation is completed or the source manifest 214 is digitally signed by an authorized entity.

In one embodiment, a content manifest may be provided on the transfer device 202A indicating a manifest of data objects specified by the client as data objects to be uploaded to the transfer device 202A and transferred to the service provider. The content manifest may indicate other information, such as information about or identifying the client, or information about the cluster from which the data objects were transferred. In one embodiment, the content manifest information may instead be provided on the source manifest (e.g., source manifest 214 described below). Once the client is satisfied that the appropriate data objects have been copied to the transfer device 202A, the client may arrange for the transfer device 202A to be physically transported to the service provider location 206.

At the service provider location 206, the transfer device 202A may be connected to one or more services of the service provider to retrieve and store the data objects. The one or more services may include a device interface service 216 for interfacing with the connected data transfer device to ingest or copy the data objects from the transfer device 202A. The one or more services may also include a data storage service 217 of the service provider. The data storage service 217 may be a persistent data storage system comprising non-volatile data storage units. The data storage service 217 may be a web or cloud-based service for persistently storing a client's data or content, and usable to make the data or content available to the client on demand. In one embodiment, the data storage service may comprise a storage service component for archiving and providing long-term backup of the client's data. The device interface service 216 may retrieve a content manifest provided on the transfer device 202A to determine content information regarding the data objects to be retrieved. The content information may include a content location of the data objects on the transfer device 202A, identification information identifying the data objects to be retrieved, and storage locations of the data storage service to which the data objects are to be copied. The content manifest may be digitally signed by one or more authorizing entities, such as an administrative entity of the client or the transfer device service of the cluster 210.

A receipt manifest 218 is generated inventorying data objects successfully copied from the transfer device 202A to a data storage location of the service provider, such as a data storage location of the data storage service 217. In one embodiment, the data storage service of the service provider may transmit an acknowledgment to the transfer device service of the transfer device 202A for each data object successfully transferred. Acknowledgement communications may be transmitted according to one or more handshaking protocols established between services or entities providing rules for sending communications back and forth. The handshaking protocol may be one known in the art, such as a TLS handshake, or may be a handshake protocol unique to the services. The transfer device service of the transfer device 202A may generate the receipt manifest 218 based on the acknowledgments received from the data storage service. The receipt manifest 218 may also include identification information identifying the data objects successfully copied to the data storage service. The receipt manifest 218 may be a static object whose entries (as shown in FIG. 4) are not modified after being finalized. For example, the information regarding the data transfer operation in the receipt manifest 218 may be designated as read-only after the transfer operation is completed or the receipt manifest 218 is digitally signed by an authorized entity. The receipt manifest 218 may be compared with the content manifest to determine data objects unsuccessfully copied from the transfer device 202A. Additional data transfer attempts may be executed to copy any data objects unsuccessfully copied in the initial attempt. In connection with copying the data objects, one or both of the transfer device service in the data storage service may digitally sign the receipt manifest 218 using their respective cryptographic keys.

After the data transfer operation is completed, the receipt manifest 218 is provided to one or more entities to facilitate processing of data objects at the client location. In one embodiment, the receipt manifest 218 may be stored on the transfer device 202B and returned to the client location 204 via any of the transport methods described above. At the client location, the transfer device 202B may be connected to the cluster 210 and the transfer device service may obtain the receipt manifest 218 from the transfer device 202B. In some embodiments, the receipt manifest may be downloaded or otherwise transmitted from a manifest service of the service provider, such as by authenticating to the service provider and obtaining the receipt manifest via a graphical user interface (e.g., a Web page).

The transfer device service of the cluster 210 may compare 220 the source manifest 214 and the receipt manifest 218 to determine a set of the data objects copied onto the transfer device 202A that were successfully copied to a storage location of the service provider. For instance, the comparison 220 may include comparing the identification information of the data objects identified in the source manifest 214 with the identification information of the data objects identified in the receipt manifest 218 to determine the set of objects. In one embodiment, the transfer device service may process data objects that were successfully copied to the storage location of the service provider in a manner different than data objects that were not successfully copied to the storage location. For instance, the transfer device service may delete the successfully copied objects from the cluster 210 and refrain from deleting data objects indicated as being unsuccessfully copied. As another example, the transfer device service may protect the unsuccessfully copied data objects from deletion or alteration, and leave the successfully copied objects unprotected. In some embodiments, the transfer device service may provide an indication, based on results of the comparison 220, to one or more computing systems of the client indicating which data objects were successfully copied and which data objects were not copied to the storage location of the service provider. Accordingly, comparing the source manifest 214 and the receipt manifest 218 helps to prevent inadvertent permanent loss of unsuccessfully transferred data objects due to defective data transfer operations to the service provider.

Figure 3:
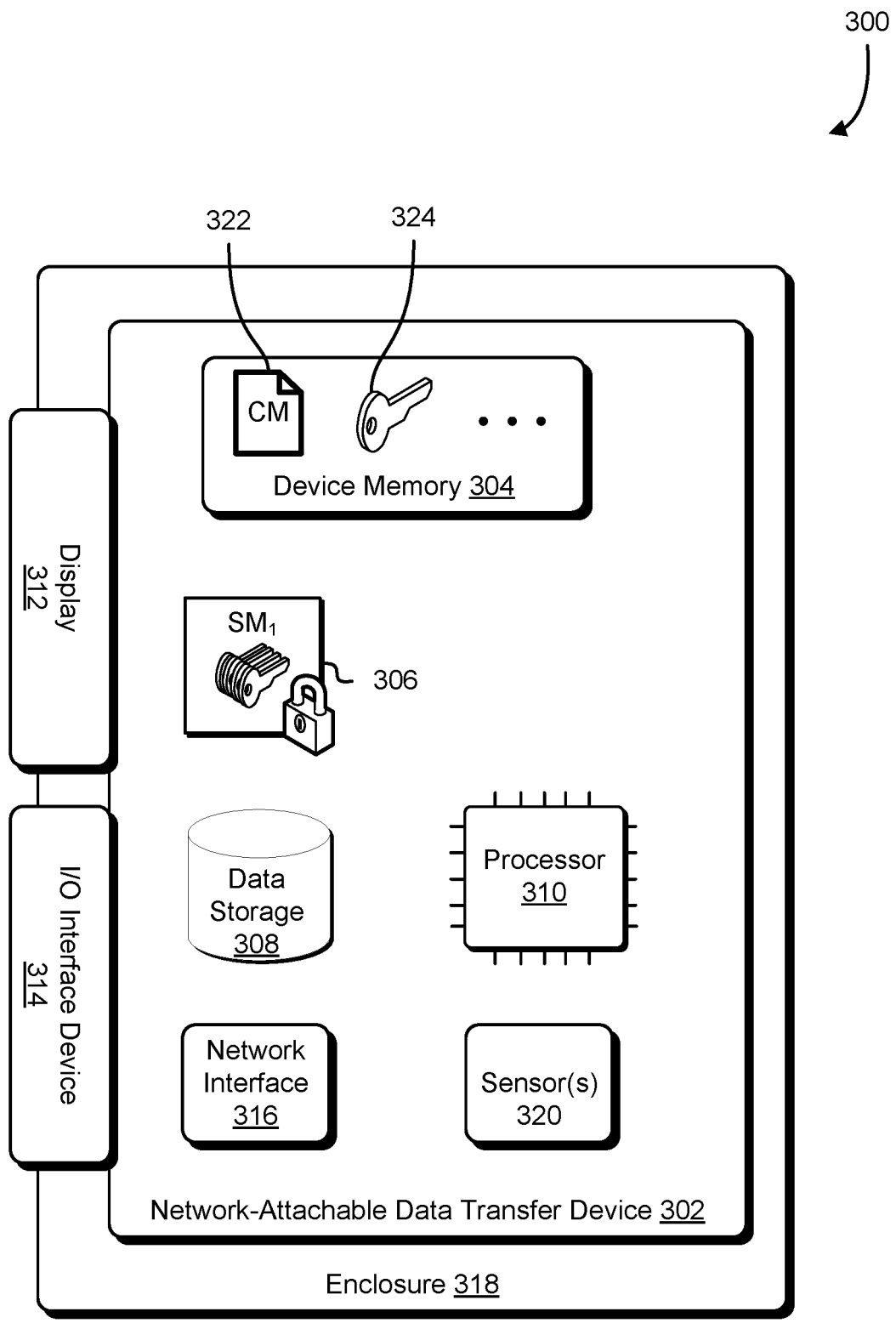
FIG. 3 shows an illustrative example of network-attachable data transfer devices in accordance with various embodiments.

FIG. 3 illustrates a diagram 300 of a network-attachable data transfer device 302 and components that may be included therein. The diagram 300 illustrates various components and modules that may be included in a network-attachable data transfer device. The network-attachable data transfer device 302 shown in FIG. 3 may be in accordance with those described elsewhere in this disclosure. The devices may be configured with fewer or additional components and/or modules. Some components and/or modules may be replaced by other suitable components and/or modules. An example of a network-attachable data transfer device 302 may include components such as, but not limited to: device memory 304; one or more security modules 306; persistent data storage 308; a processor 310; an electronic display 312; a human interface device 314; a network interface 316 and sensor(s) 318. The network-attachable data transfer device may be enclosed in a tamper-proof enclosure 320.

A network-attachable data transfer device 302 may be configured to have device memory 304. Any suitable form of volatile or non-volatile memory may be used, such as ROM, solid-state drives, RAM, registers, caches, and other types of temporary storage. The memory 304 may include an operating system that provides executable program instructions that, when executed by the processor 310, cause the device 302 to perform in the manner described herein. The memory 304 may be configured to store a cluster manifest 322 and cryptographic material such as a cryptographic key 324 that may be obtained from an encrypted payload of the cluster manifest. The cryptographic key 324 may be used by the network-attachable data transfer device 302 to perform one or more features, functions, operations, requests, and the like. In some embodiments, the cluster manifest 322 is obtained from another device of the cluster.

A network-attachable data transfer device 302 may be configured with one or more security modules such as the security modules 306 shown in FIG. 3. A security module may be a trusted platform module (TPM), physically unclonable function (PUF), hardware security module (HSM), and the like. In some embodiments, a security module is a physical computing device that safeguards cryptographic keys by storing them within a tamper-resistant physical device. Security modules may be used for cryptographic key generation and storage, and to perform cryptographic operations for authorized clients of the security module. In general, the cryptographic keys are not exportable from the security module in an unprotected form. In some embodiments, a security module is configured to perform a cryptographic operation such that an input value and an output value have different fixed sizes. For example, where the cryptographic operation is an encryption operation, the input plaintext may be of a first fixed size (e.g., 254 bytes) and may generate an output ciphertext that is of a second fixed size (e.g., 312 bytes). Conversely, a decryption operation may accept an input ciphertext that is 312 bytes in size and generate a corresponding output plaintext that is 254 bytes in size. A security module may be configured to perform various types of cryptographic operations such as encrypting data, decrypting data, verifying authenticity of data, and more. Encryption and decryption operations may be extended to support authenticated encryption and authenticated decryption, respectively. A security module that has been tampered with or been subject to an attempted tampering may be unable to perform cryptographic operations.

In some embodiments, authenticity of a security module is verified by successfully decrypting a ciphertext. In some embodiments, the network-attachable data transfer device 302 is further configured with one or more persistent data storage 308 components. Persistent data storage media may include non-volatile storage such as hard drives, tape drives, magnetic drives, non-volatile flash memory, and the like. A persistent storage medium may be configured to store large amounts of encrypted data (e.g., from a large data store such as a customer storage system) during shipment from one data facility to another data facility. In some embodiments, the network-attachable data transfer device 302 receives the data to be stored via a network connection accessible through the enclosure 318 and configured to provide access to the persistent storage medium as a network-attached storage device. In some examples, the network-attachable data transfer device 302 receives the data to be store from another cluster device via a communication session such as a cryptographically protected communication session (e.g., TLS session). In some embodiments, the persistent data storage 308 is configured to operate in connection with the persistent data storage of other network-attachable data transfer devices in a cluster. For example, in some embodiments, data is striped (e.g., in a RAID 0 configuration) between persistent storage media across multiple media within and/or across multiple network-attachable data transfer devices of a cluster. As a second example, data may be mirrored (e.g., in a RAID 1 configuration) between persistent storage media across multiple media within and/or across multiple network-attachable data transfer devices of a cluster. Data may be organized and/or partitioned in various ways—for example, each persistent storage medium may be used to store a database shard of a database.

A network-attachable data transfer device 302 may have one or more processors 310 such as central processing units (CPUs) that may be configured to perform data transfer operations and cryptographic operations. In some embodiments, a network-attachable data transfer device 302 has one or more motherboards that are each configured with one or more processing units such as the processor 310 illustrated in FIG. 3. Furthermore, in some embodiments, each of the motherboards includes at least one security module.

The network-attachable data transfer device 302 may also include an outward-facing electronic display 312. The electronic display may be used to display a destination location (e.g., in lieu of a shipping label). The display 312 may incorporate various types of display technologies such as low-power electronic-ink (e-ink), organic light emitting diodes (OLED), active-matrix organic light-emitting diode (AMOLED), flexible displays, and other such technologies. The display may further be a touch-screen display that a customer may interact with using a finger, stylus, or other input device. The network-attachable data transfer device 302 may be configured with multiple displays using multiple display technologies. The display may be visible to a customer, postal employee, etc. through the protective exterior enclosure 318.

A human interface device (HID) 314 may also be included as part of a network-attachable data transfer device 302. The human interface device 314 may be used to unlock the device—for example, a customer may unlock a device by: entering a password into an alphanumeric keyboard or display device (e.g., touchscreen); entering a personal identification number (PIN) or unlock code; performing a biometric verification using, for example, speech, fingerprint, and/or iris recognition using one or more sensors.

The network-attachable data transfer device 302 may further include a network interface 316. The network interface may be used as an interface between an external network (e.g., a computer network or a service provider network) and the network-attachable data transfer device 302. In some embodiments, the network interface is used to communicate with other devices of a cluster in an ad-hoc manner—for example, various types of decentralized ad hoc networks. In some embodiments, the network interface uses a wireless interface such as a Wi-Fi network or a cellular network.

The network-attachable data transfer device 302 may have a tamper-proof enclosure 318 that acts as an enclosure to protect the device from being physically tampered with. The enclosure may be used to physically deny access to various internal components and modules such as RAM, security modules, one or more persistent storage media, and processing units, network interfaces, data stored on any of the above components, and more. In some embodiments, the enclosure 318 is made of hardened materials and may be ruggedized in accordance with one or more military standards and/or electronics industry standards. The enclosure may prevent access to internal components while simultaneously allowing access to other components, such as a display and/or human interface device that a customer may interact with. The enclosure 318 may have sensors 320 for detecting kinetics to detect physical treatment of the device, such as sensors for measuring force, accelerometers, gyroscopes, etc. The enclosure may further be equipped with CPU and/or memory to monitor sensors. Conditions detected by the enclosure may cause the system to enter a locked state—for example, detection of the device being subject to strong forces may indicate an attempt to tamper with the device (e.g., by breaking open the enclosure to access internal components).

While various components of a network-attachable data transfer device have been illustrated in FIG. 3, the network-attachable data transfer device may be configured with various components added, removed, modified, or some combination thereof. For example, a network-attachable data transfer device may further include geolocation sensors such as a global positioning system (GPS) receiver that may be used as part of determining a shipping address to display. The GPS receiver may also be used to lock the device if it is determined the device is not in an expected geolocation or that the device is not within a prescribed distance from an expected path that the shipment of the device is expected to take.

In some embodiments, the network-attachable data transfer device includes ports and other peripheral connectors that may allow for additional functionality. For example, peripherals may be attached to the network-attachable data transfer device via a universal serial bus (USB) that may be accessible through the enclosure 318. In some embodiments, the system supports USB-pluggable security devices such as a portable hardware authentication device that may function as a security module.

FIG. 4 is an illustrative example of a manifest 400 generated according to one or more data transfer operations. The manifest 400 may correspond to the source manifest or the receipt manifest described above. In one embodiment, the device storage service generates the manifest 400 during the data transfer process such as by updating the manifest 400 after transfer of each data object or generating the manifest 400 at the end of the data transfer operation. Manifest 400 may include, for each data object to be transferred, a data object identifier 402, a checksum value 404, metadata 406 and a communication status 408. The data object identifier 402 may be an integer or character identifier assigned to a data object that uniquely identifies the object. The data object identifier 402 may be, for instance, a fingerprint generated for the corresponding data object. In one embodiment, the data object identifier 402 may include a filename generated by an entity other than the transfer device service for identifying a data object or grouping of data objects to be transferred. In some embodiments, the data object identifier 402 may be an identifier generated by the transfer device service for identifying a data object or a grouping of data objects to be transferred. In one embodiment, inclusion of the data object identifier 402 for a data object in the manifest 400 may be an indicator that the data object was successfully copied or transferred. The integrity information 404 may be used to verify the integrity of a corresponding data object. The integrity information 404 may be a value generated by performing a hash function or a checksum function (e.g., MD5, SHA1, SHA2) on the data object for the corresponding data object identifier 402.

The manifest 400 may include metadata 406 for the data objects, including a timestamp T indicating a time and/or date when a data transfer operation for the corresponding data object was performed. The metadata 406 may also include location information (Loc) indicating a data region or location in the storage device in which the corresponding data object is stored or to be stored. The metadata 406 may further include other metadata such as the size of the data object to be transferred. The communication status 408 may be provided in the manifest 400 indicating a status of whether the transfer operation for the corresponding data object was successful or unsuccessful. For a source manifest, for example, the transfer device service may generate a transfer status indicating whether the corresponding data object was successfully or unsuccessfully transferred onto the data storage device from a cluster at the client location. For receipt manifest, the transfer device service may generate a transfer status indicating whether the corresponding data object was successfully or unsuccessfully transferred from the data storage device to a service provider location. Other transfer status indicators are contemplated as being within the scope of the present disclosure, such as a transfer status indicating a transfer progress of the corresponding data object to or from the data storage device. Further, while FIG. 4 illustrates source manifests and receipt manifests sharing a common format, source manifests may be formatted differently than receipt manifests.

The manifest 400 may include one or more digital signatures verifying one or more entities associated with data transfer operations associated therewith. The device storage service may generate a digital signature 410A of the manifest 400 using a cryptographic key unique to the storage device to or from which the data objects are being transferred (e.g., a cryptographic key securely held in a security module of the storage device). In one embodiment, the source manifest may include a digital signature 410B generated by one or more storage devices in the cluster of data storage devices using one or more cryptographic keys. In one embodiment, the receipt manifest may include a digital signature 410B generated by one or more services of the service provider such as an authentication service or the data storage service. Digital signatures of and/or in the manifest may be used in various ways in accordance with different embodiments. Generally, a digital signature of and/or in a manifest may be used by an entity (e.g., computer system, such as a storage device or the storage device service) that is configured to trust a key used to generate the digital signature and operate in accordance with whether the digital signature is valid. As an example, an entity may use a digital signature to determine whether the manifest and/or information in the manifest is authentic and/or whether the manifest and/or information contained therein was generated by a trusted entity. In a specific example, when comparing the manifest to another manifest, a digital signature may be used to ensure that information is authentic and, therefore, trusted to enable operations (e.g., deletion) to occur. For instance, if a digital signature of an entry in a manifest (or of the whole manifest) is invalid or otherwise untrusted, a deletion may not occur even if the entry indicates successful transfer to a data storage service of corresponding data.

Figure 5:
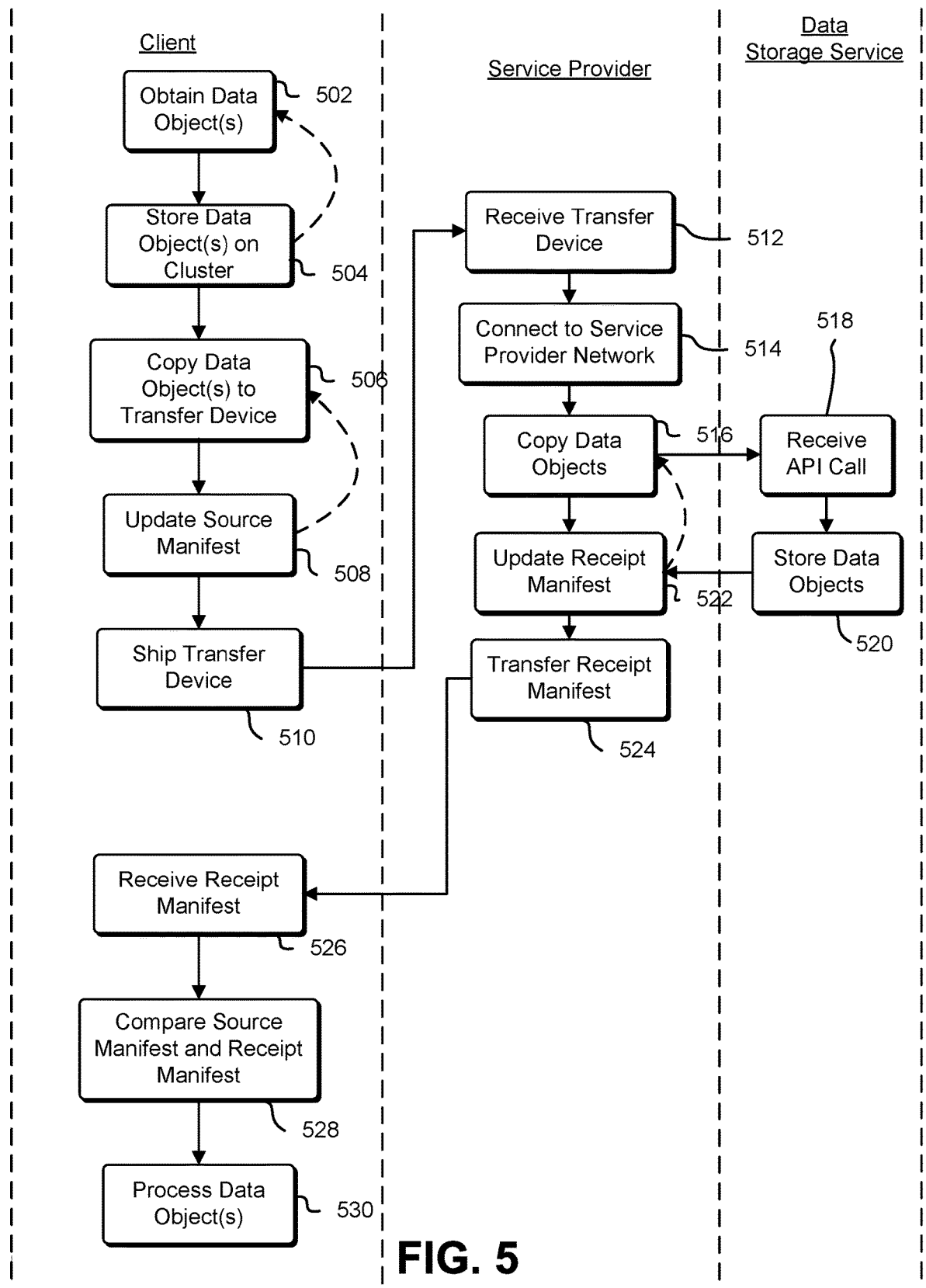
FIG. 5 shows an illustrative example of a process for transferring data objects to and from a data transfer device.

FIG. 5 illustrates a process 500 for transferring data objects from a client to a transfer device service at a service provider location. Portions of the process may be performed by a transfer device service of a cluster of data storage devices at the client location. Other portions of the process performed at a service provider location may be performed by a transfer device service of the service provider. The service may obtain 502 data objects from a storage device of the client such as a local server. The service may store 504 the data objects onto a cluster of network-attachable data storage devices such as those described above with respect to FIGS. 1-3. Using a user interface of the service, a user may select one or more of the data objects on the cluster to transfer to the service provider and initiate copying of the data objects. The user interface selection may cause the service to generate a content manifest identifying and relocating the data objects on the cluster to be transferred. The service may then copy 506 the data objects from the cluster to a data transfer device for transport to the service provider location. When the data objects are copied onto the data transfer device, the service may generate or update 508 a source manifest inventorying the data objects that were successfully copied. The copying 506 and updating 508 may be a recursive process by which the source manifest is initially generated then repeatedly updated as the data objects are successfully copied. The source manifest and/or content manifest may be copied onto the transfer device for transport to the service provider. Once all of the data objects are copied onto the data transfer device, the data transfer device may be disconnected from the cluster and transferred 510 to the service provider location as described above.

The data transfer device may be received 512 at the service provider location and connected 514 to a service provider network of the service provider. The transfer device service of the service provider may initiate copying 516 of data objects from the data transfer device to a storage location of the service provider. In one embodiment, the device service may issue an instruction to a data storage service of the service provider, such as the data storage service described above with respect to FIG. 2, to begin receiving and storing data objects. The instruction may be generated based at least in part on the content manifest, and may include information identifying the client, specifying the data objects to be copied, and information related to the cluster from which the data objects were copied. The instruction may be received 518 by the data storage service in the form of an API call, another type of network request, or other suitable format. The instruction may cause the data storage service to begin receiving and storing 520 the data objects copied from the data transfer device. As the data storage service receives or stores the data objects, the data storage service may provide an acknowledgment to the device service indicating successful or unsuccessful storage of the data objects to a data storage system of the data storage service. The acknowledgment may be based on an established handshaking protocol between the device service and the data storage service. The acknowledgment may include information for the receipt manifest such as data object identifiers, integrity information, metadata or transfer status as discussed above with respect to FIG. 4. The acknowledgment may be digitally signed by the data storage service. In one embodiment, the device service may copy 516 the data objects from the data transfer device to a different storage location, such as a second cluster of data storage devices or an external third-party storage system. The data storage service may send a transfer status indicating, for instance, whether a data object was successfully received by the data storage service, successfully stored by the data storage service, or a progress for receiving or storing the data object. The transfer status may be included in the acknowledgment or may be a separate communication. The device service of the service provider may generate or update 522 a receipt manifest inventorying data objects successfully transferred to the data storage system. The receipt manifest may be generated or updated in a manner described above with respect to the source manifest.

After attempting to transfer, either successfully or unsuccessfully, every data object on the data transfer device, the service provider may transfer 524 or otherwise make the receipt manifest available to the client. In one embodiment, the service provider copies or transfers the receipt manifest to the same data transfer device that transported the data objects, which is then returned to the client for inspection and further use. The service provider may copy or transfer the receipt manifest to any data transfer device scheduled or flagged for return to the client. In some embodiments, the service provider uploads the receipt manifest to the data storage service, email the receipt manifest to the client, or make receipt manifest available to the client in any other suitable manner. After the client receives 526 the receipt manifest, a service (e.g., cluster service of the cluster) for the client may compare 528 the source manifest and the receipt manifest to determine a set of data objects that were successfully copied to the data storage system from the data transfer device.

The client service may process 530 one or more of the data objects based on a result of the comparison 528. An indication that a data object was not successfully transferred may result in the data object being processed 530 differently than it would be if the data object was indicated as being successfully transferred. For instance, a negative indication that a data object was successfully transferred may result in the data object being marked or tagged as having a protected status. By contrast, a positive indication that a data object was successfully transferred may result in a delete operation being performed on the data object. Processing of the data object based on the comparison is discussed in further detail below with respect to FIG. 8.

Figure 6:
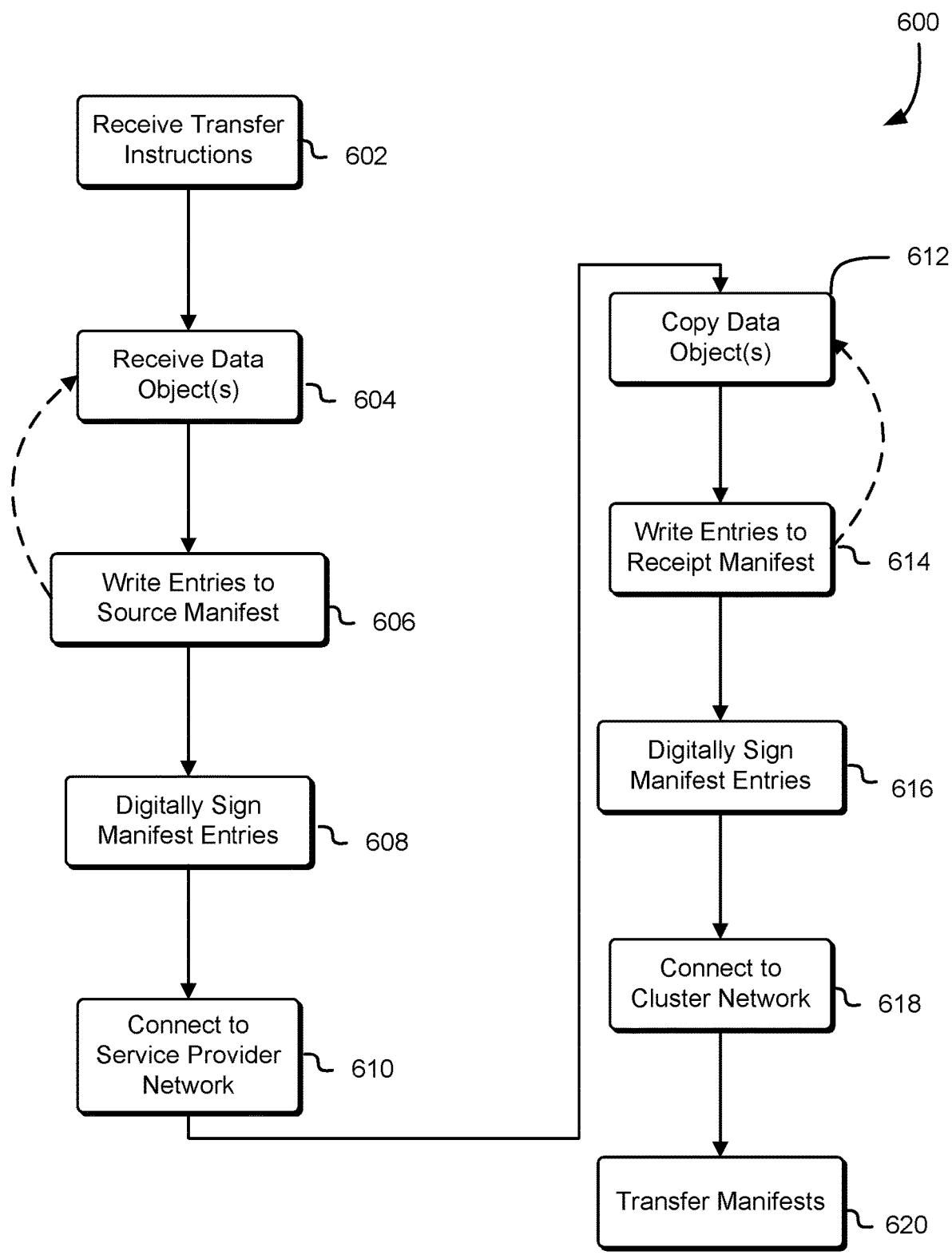
FIG. 6 shows an illustrative example of a process performed by a transfer device service operating on a data transfer device for inventorying and transferring data objects.

FIG. 6 illustrates a process 600 performed by a transfer device service operating on a data transfer device for inventorying and transferring data objects. The transfer device may be connected to a cluster of data transfer devices. The transfer device may receive 602 instructions to transfer one or more data objects stored on the cluster onto the data transfer device. The instructions may be received by the data transfer device in the form of an API call, a network request, or other suitable format. Instructions may include a content manifest specifying the data objects to be transferred onto the data transfer device, as described about with respect to FIG. 2. The device service may obtain or receive 604 copies of the data objects from one or more of the transfer devices in the cluster. The device service may write entries 606 to a source manifest indicating information regarding the copies of the data objects, such as the transfer status information or other information (e.g., object identifier, metadata) discussed above with respect to FIG. 4. The source manifest may be provided on the transfer device itself or on one or more of the transfer devices in the cluster. The receiving 604 and the writing entries 606 steps may be recursively performed as data objects are progressively copied onto the transfer device. The device service may digitally sign 608 one or more of the source manifest entries using a cryptographic key associated with the transfer device. In one embodiment, the device service may digitally sign the source manifest itself. After ingesting or storing one or more of the data objects specified in the cluster manifest, the data transfer device may be disconnected from the cluster of transfer devices and transported to a service provider location.

In connection with transferring the data objects (e.g., in steps 604 & 606), the device service may generate a set of status information, in addition to information regarding whether the data object was successfully or unsuccessfully transferred, regarding the data objects or the transfer operations, such as state information or error information. State information may include information regarding a state of the data objects (e.g., encrypted/unencrypted, digital signature information of the data objects), the cluster (e.g., identification information of devices included in the cluster), or the transfer device to which the data objects are transferred. The error information may specify information regarding errors occurring in connection with the transfer, such as corruption of the data object or that the data object could not be located in the cluster. The device service and/or the cluster service may operate to resolve any issues or errors related to transfer of the data objects—for example, by reinitiating the transfer, repairing a data object, or conducting a search to locate any missing information. One or more of the set of status information may be written to the source manifest or otherwise provided to entities in the cluster.

At the service provider location, the data transfer device may be connected 610 to a service provider network. The device service may copy 612 one or more of the data object specified in the cluster manifest as described above with respect to FIG. 5. The device service may write entries 614 indicating information regarding the copies of the data objects, e transfer status information or other information discussed above with respect to FIG. 4. Device service may digitally sign 616 one or more of the receipt manifest entries using the cryptographic key associated with the transfer device. In one embodiment, the device service may digitally sign the receipt manifest itself. After copying the one or more of the data objects specified to the data storage service of the service provider, the data transfer device may be disconnected from the cluster of transfer devices and transported back to the client location. At the client location, the data transfer device may be connected 618 to the cluster network. Thereafter, the device service may transfer 620 the source manifest and the receipt manifest to a cluster service for the cluster of data transfer devices for determination of which data objects were successfully copied onto the transfer device and subsequently copied to a data storage system of the service provider.

In connection with transferring the data objects to the data storage system (e.g., in steps 612 & 614, in process 700 described below), the device service or the service provider may generate a set of status information, in addition to information regarding whether the data object was successfully or unsuccessfully transferred, regarding the data objects or the transfer operations, such as the state information or the error information described above. The error information may include details regarding a failure to successfully transfer data object(s) to the data storage system or failure of a service of the service provider to successfully receive the data object(s), such as a network connection failure. The device service and/or the service provider may operate to resolve any issues or errors related to transfer of the data objects to the data storage system. One or more of the set of status information may be written to the receipt manifest.

Figure 7:
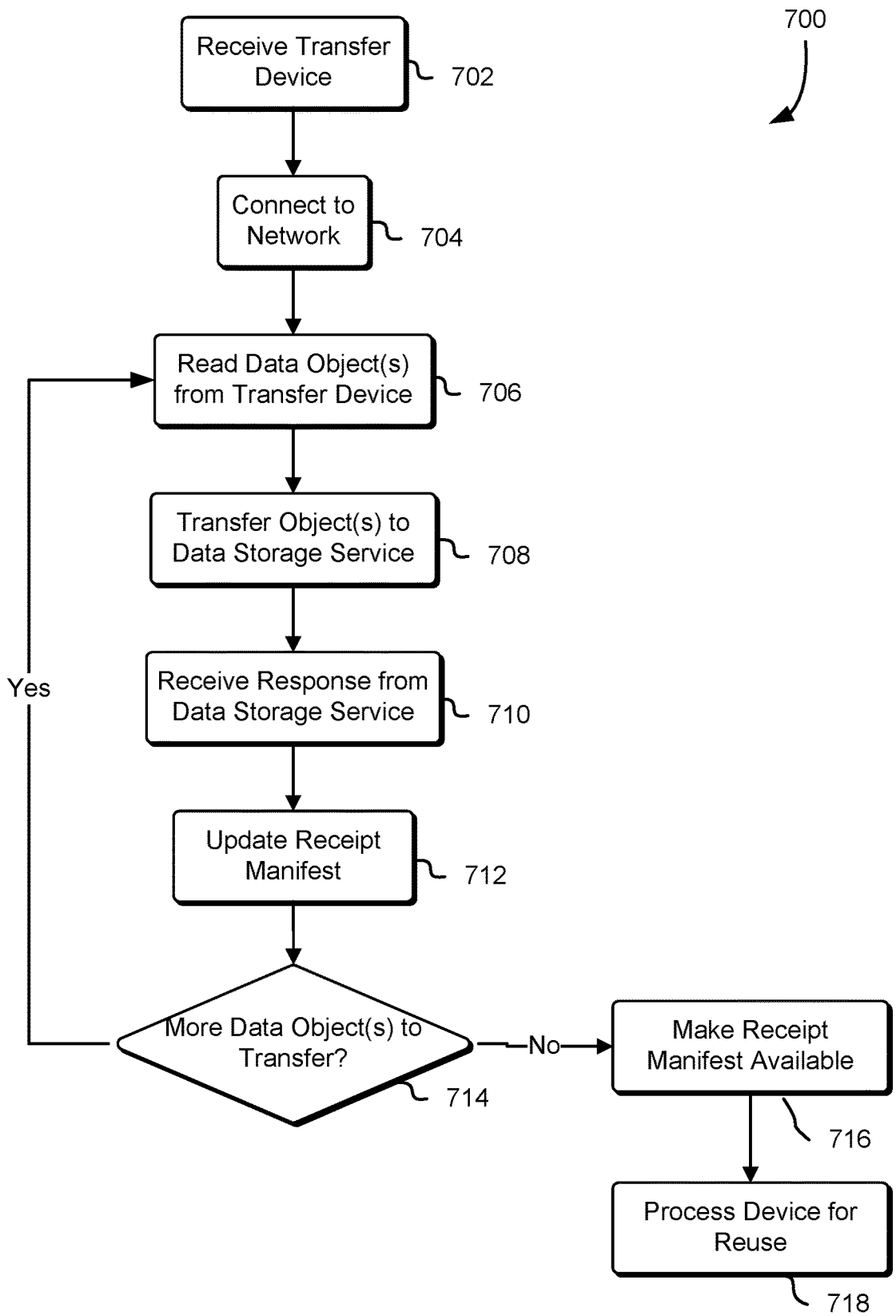
FIG. 7 shows an illustrative example of a process performed by a service provider to receive and store data objects from the data transfer device.

FIG. 7 illustrates a process 700 performed by a device interface service of the service provider, such as discussed above with respect to FIG. 2. The transfer device transported from the client location is received 702 at the service provider and connected 704 to a service provider network of the service provider. The device interface service reads 706 one or more data objects from the transfer device. The one or more data objects read from the transfer device may include the cluster manifest. The interface service may then transfer 708 one or more of the objects to a data storage service of the service provider. The transfer 708 may be initiated by sending an instruction comprising, for example, API call to the data storage service as discussed above with respect to FIGS. 2 and 5. The interface service may receive 710 a response from the data storage service regarding the status of the one or more data objects, such as the acknowledgment using a handshake protocol discussed above with respect to FIGS. 2 and 5. The interface service may then generate or update 712 a receipt manifest indicating a status of whether the one or more data objects were successfully copied to the data storage system of the data storage service. The interface service we then check to see whether more data objects are available 714 or to be copied from the transfer device to the data storage system.

If the interface service determines that more data objects are available or should be transferred in step 714, the interface service returns to read 706 one or more data objects from the transfer device. The interface service may compare the receipt manifest with the source manifest provided on the transfer device to determine whether all the data objects specified on the source manifest were successfully copied to the data storage service. Otherwise, the interface service determines that all data objects specified to be transferred from the transfer device have been copied to the data storage system. Accordingly, the interface service may make 716 the receipt manifest available to the client by transferring or copying the receipt manifest to the transfer device, which may be scheduled for return to the client. In one embodiment, making 716 the receipt manifest available may include providing the receipt manifest to the data storage service for transfer onto the data storage system, or by other means of electronic communication, such as email. The interface service processes 718 transfer device for reuse, such as by performing a delete operation that deletes the one or more data objects on the transfer device. In one embodiment, the delete operation may delete only the one or more data objects that the receipt manifest indicates were successfully transferred onto the data storage system. Those of ordinary skill in the art will appreciate that the steps 716 and 718 mirror reversed such that the transfer device is processed 718 for reuse before transferring 716 the receipt manifest to the transfer device.

The interface service may generate or process the set of status information described above in connection with transferring the data objects to the data storage system, such as by generating error information regarding a failure to transfer the data objects to the data storage system. The interface service may perform one or more of the steps in the process 700 based on the set of status information—for instance, in step 714, the interface service may determine to initiate another attempt to transfer a data object based on error information indicating that an error occurred during a previous data transfer attempt. As another example, the interface service may process the device 718 according to the set of status information, such as by not deleting data object(s) that were unsuccessfully transferred.

Figure 8:
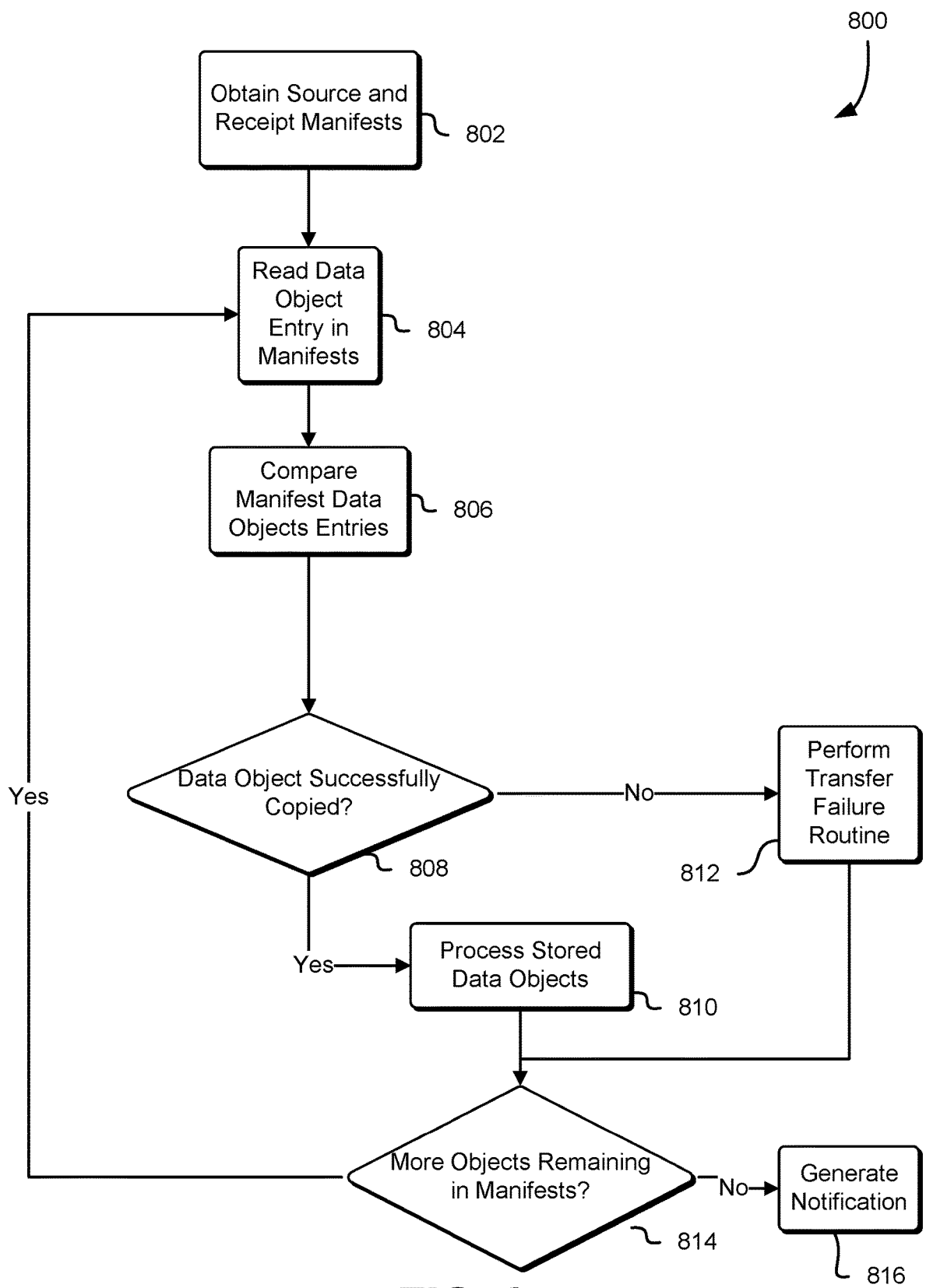
FIG. 8 shows an illustrative process performed by a cluster service for processing data objects based on manifests.

FIG. 8 illustrates a process 800 performed by a cluster service for processing data objects stored on a cluster of data transfer devices based on the source manifest in the receipt manifest. The cluster service may operate in concert with the transfer device service of the data transfer device, or the transfer device service of the data transfer device may be subordinate to the cluster service. The cluster service obtains 802 the source manifest and the receipt manifest. The cluster service reads 804 a data object entry from the source manifest and a corresponding data object entry from the receipt manifest. In one embodiment, the data object entries may be identified by a data object identifier such as that discussed above with respect to FIG. 4.

The cluster service may then compare 806 the data object entries from the source manifest in the receipt manifest to determine whether the corresponding data object was successfully copied 808. The comparison 806 may involve comparing one or more data entries from the manifests, such as the data entries discussed with respect to FIG. 4. In particular, the cluster service of the cluster may compare the communication status 408 for the data object identifiers in the source manifest with the communication status 408 of corresponding data object identifiers in the receipt manifest. The cluster service may determine that a data object indicated as having a successful communication status 408 in both the source manifest and the receipt manifest has been successfully copied. The cluster service may determine that a data object indicated as having an unsuccessful transfer status in either the source manifest or the receipt manifest has not been successfully copied. Other information provided in the source manifest in the receipt manifest may be compared to determine which data objects were successfully copied, such as the integrity information or one or more components of the metadata. A determination by the cluster service that a data object has been successfully transferred may be based at least in part a determination that the integrity information matches in both the source manifest and the receipt manifest (e.g., identical checksums). The determination that a data object has been successfully transferred may be based at least in part on a determination that one or more components of the metadata matches for both the source manifest and the receipt manifest. For instance, the cluster service may determine whether the size of the data object is the same in both the source manifest and the receipt manifest. A determination that one or more aspects of the data entries, such as the integrity information, do not match or otherwise correspond in both the receipt manifest and the source manifest may be a basis for determining that the corresponding data object was not successfully copied to the data storage system of the service provider.

As a result of a determination 808 that the data object was successfully copied to the data storage system of the service provider, the cluster service may process 810 the data object(s) in the cluster according to one or more processing routines. For instance, in processing 810 the data object(s), the cluster service may perform a delete operation may on the corresponding data objects in the cluster of transfer devices. Performance of the delete operation, in one embodiment, may cause data storage regions of the cluster storing one or more of the successfully copied data objects to be overwritten with fixed or random sequences of bits, thereby causing a "hard" delete of the data objects. In some embodiments, the delete operation may be a "soft delete" marking or tagging a record indicating that the data object is to be deleted, or indicating that the data storage region corresponding to the data object may be overwritten with new data. Other methods of performing a "soft delete" operation are contemplated herein such as, for example, downsampling the data object (e.g., replacing it with a lower resolution copy) or transcribing the data object.

Other or additional processes may be performed in the processing 810. In one embodiment, the cluster service may generate status information in the cluster indicating the transfer status of the data object(s), such as metadata associated with the data object(s) indicating successful or unsuccessful transfer thereof, or marking or setting a flag in a table indicating the transfer status of the data object(s). In processing 810 the data object(s), the cluster service may perform further operations based on the transfer status. For instance, the cluster service may cause data object(s) indicated as being successfully transferred from being resubmitted to the service provider on the data transfer device, such as by erasing the data object(s) from the data transfer device and preventing the data object(s) from being retransferred to the data transfer device.

In processing 810 the data object, the cluster service may generate other status information of the data object(s) in the cluster, such as an indication that the data object(s) are objects to be deleted or protected in the cluster, or error information regarding the transfer operations. The status information may be in the form of metadata associated with the data object(s) or may be indicated in a table stored in the cluster identifying the data object(s). For instance, the storage status may indicate information regarding deletion of the data object(s), such as a specific time that a deletion operation for the data object(s) is to be performed, a permission allowing the data object(s) to be deleted during maintenance operations, a specific time at or after which the data object(s) may be deleted. As another example, the storage status may indicate information regarding protection of the data object(s), such as an indication that the data object(s) should not be deleted, or an indication that the data object(s) should be moved to a storage location or partition in which there is a low probability that the data object(s) will be lost or erased. In one embodiment, the transfer status may indicate error information regarding one or more errors that occurred in connection with the transfer operation—for example, one or more errors that occurred in connection with transferring data object(s) to the data transfer device from the cluster, transferring data object(s) from the data transfer device to the service provider, or transferring data object(s) to the data storage system of the service provider.

As a result of a determination 808 that the data object was not successfully copied to the data storage system of the service provider, the cluster service may perform 812 a transfer failure routine. The transfer failure routine may comprise one or more operations causing the cluster service not to perform one or more actions that could result in permanent loss of the corresponding data object. For instance, the action may mark or tag the data object not indicated as being successfully transferred as having a protected status. The protected status may be indicated as an attribute associated with the data object, such as a flag set that indicates that the data object or region in which the data object is located should not be deleted. The flag may be located in the metadata for the data object or indicated in a record or table referencing the data object. The action may cause the corresponding data object to be transferred to a different storage location on the cluster such as a separate data storage area or partition in which data objects may not be deleted by the cluster service. As another example, processing of the unsuccessfully transferred data object may comprise scheduling or providing the data object to a data transfer device for another transfer attempt to the service provider, or marking or tagging the data object for a future transfer attempt to the service provider. In an embodiment where a "hard delete" is performed on successfully transferred data objects, the different operation may be a "soft delete" of one or more of the unsuccessfully transferred data objects. The processing of the unsuccessfully transferred data may prevent the data object from being selected for modification or deletion.

After processing 812 the data objects or performing 812 the transfer failure routine, the cluster service may determine 814 whether there are more objects remaining in the source manifest or the receipt manifest. If the cluster service determines that there are one or more unanalyzed data objects remaining in manifests, the cluster service may access or read 804 the next data object in the source manifest and/or the receipt manifest. If the cluster service determines that no data objects are left in the source manifest or the receipt manifest, the cluster service may generate 816 a notification indicating that the data object transfer operation is completed.

Figure 9:
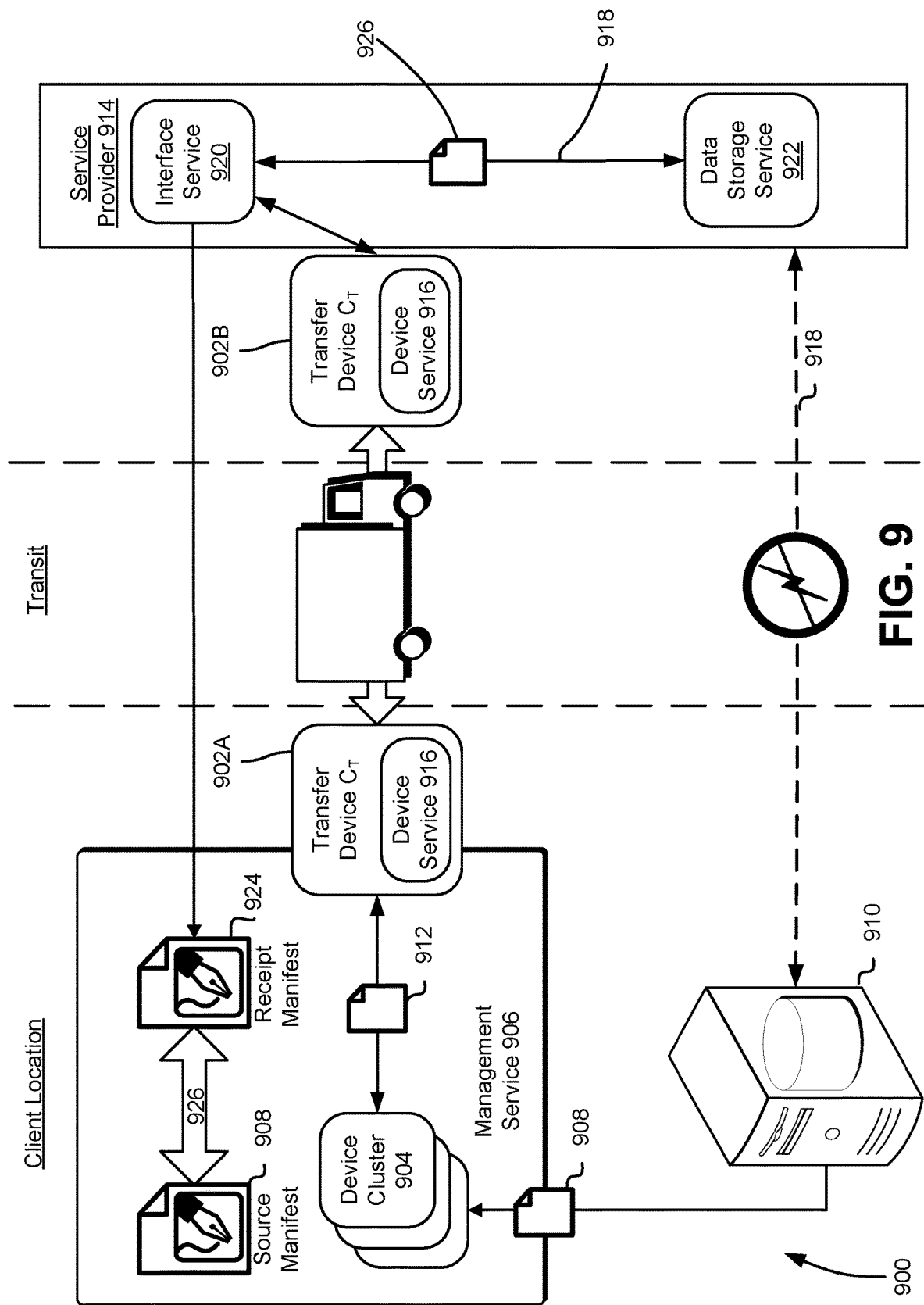
FIG. 9 shows an environment for processing a data transfer at a client location and at a service provider location.

FIG. 9 illustrates an environment 900 for processing a data transfer device at a client location and at a service provider location. A network-attachable data transfer device 902A is joined with a device cluster 904 at a client location. A cluster service 906 collectively operating on the device cluster 904 is operable to ingest or receive a plurality of data objects 908 of the client onto the device cluster 904 as described above with respect to FIGS. 1 and 2. The plurality of data objects 908 may be provided from one or more computing systems 910 of the client, which may include one or more processors, servers, and/or data storage units. It is noted that a network connection 911 between the one or more computing systems 910 and a service provider 914 may have insufficient bandwidth or complexity to efficiently and effectively transfer the data objects 912 in this instance. The cluster service 906 may initiate a data transfer operation to transfer a set of data objects 912 of the plurality of data objects 908 stored in the cluster 904 onto the transfer device 902A for physical transportation to the service provider 914. In connection with the data transfer operation, a source manifest 908 may be generated inventorying a set of the data objects of the plurality of data objects 912 successfully copied onto the transfer device 902A, as described above with respect to FIGS. 1, 2, 4 and 5. In one embodiment, the source manifest 908 may be generated at least in part by the cluster service 906. In one embodiment, the source manifest 908 is generated at least in part by a device service 916 of the transfer device 902. The transfer device 902A may provide an acknowledgment of successfully copied data objects to the cluster service 906. When the transfer operation of data objects to the transfer device 902A is completed, the transfer device 902A may be physically transported or shipped to the service provider 914.

At the service provider 914, the transfer device 902B may be connected to a service provider network 918 via a network connection between the service provider 914 and a network connection of the transfer device 902B, as described above with respect to FIG. 3. An interface service 920 of the service provider may interface with the device service 916 of the transfer device 902B to communicate and transfer data between the transfer device and the service provider 914. A data transfer operation may be initiated to copy the plurality of data objects 912 on the data transfer device 902B to a data storage system of the service provider 914. The interface service 920 may interface with a data storage service 922 of the service provider 914 to copy the plurality of data objects 912 to the data storage system, as described above with respect to FIGS. 5 and 7. A receipt manifest 924 may be generated inventorying a set of data objects 926 of the plurality of data objects 912 successfully copied to the data storage system of the service provider 914 in connection with the data transfer operation, as also described above with respect to FIGS. 5 and 7. The data storage service 922 may provide an acknowledgment of successfully copied data objects to the interface service 920. The acknowledgment may be in the form of a communication provided according to a handshake protocol established between the services.

After the data transfer operation is completed, the receipt manifest 924 may be provided to the client, such as by transporting the receipt manifest 924 to the client on the transfer device 902B, transmission via network communication, or making the receipt manifest 924 electronically available for retrieval. The cluster service 906 may process one or more of the plurality of data objects 912 based at part on the comparison 926 between the source manifest 908 and the receipt manifest 924, as described above with respect to FIG. 8.

Figure 10:
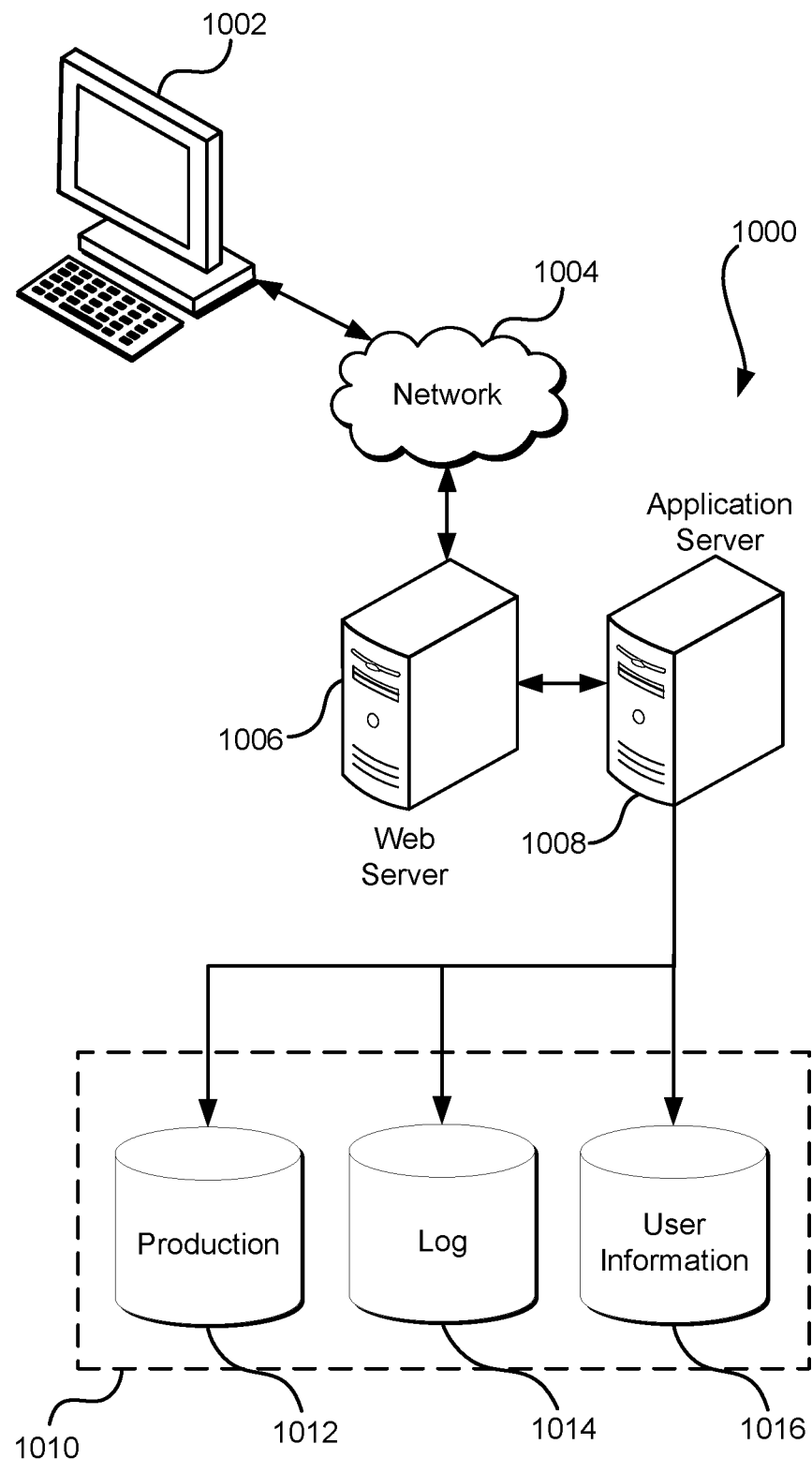
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system at a service provider location, a source manifest inventorying a first cryptographic key and a set of encrypted data objects of a plurality of data objects that have been encrypted using the first cryptographic key and successfully copied to a network-attachable data transfer device from a customer data source at a customer location;
generating, by the computer system at the service provider location, a receipt manifest inventorying encrypted data objects of the plurality of data objects that have been successfully decrypted using a second cryptographic key and copied from the network-attachable data transfer device to a data storage service at the service provider location;
performing, by the computer system at the service provider location, a comparison of the source manifest and the receipt manifest to determine a subset of the set of encrypted data objects that have been successfully decrypted using the second cryptographic key and copied from the network-attachable data transfer device to the data storage service;
performing, by the computer system at the service provider location, a set of operations to delete the subset of the set of encrypted data objects from the network-attachable data transfer device in response to the comparison; and
providing, by the computer system at the service provider location, status information indicating the subset of the set of encrypted data objects deleted from the network-attachable data transfer device.

2. The computer-implemented method of claim 1, wherein:
the receipt manifest includes a digital signature of the data storage service; and
performing the set of operations is conditioned on successful verification of the digital signature.

3. The computer-implemented method of claim 1, wherein the status information identifies the subset of the set of encrypted data objects deleted from the network-attachable data transfer device.

4. The computer-implemented method of claim 1, wherein the status information is to be provided to the customer location in response to one or more calls to an application programming interface.

5. A system, comprising:
one or more processors;
memory that stores computer-executable instructions that, if executed, cause the one or more processors to:
receive, at a second location, a first manifest that inventories a first set of data objects written to a data transfer device at a first location, the data transfer device transported to the second location;
perform, at the second location, a comparison between the first manifest and a second manifest that identifies a second set of data objects written from the data transfer device to a data storage service;
determine, based at least in part on the comparison, a subset of the first set of data objects to be deleted from the data transfer device at the second location; and
transmit, to the first location, data indicating at least the subset of the first set of data objects.

6. The system of claim 5, wherein the subset of the first set of data objects is determined based at least in part on comparison of a transfer status in the first manifest corresponding to a data object identifier and a communication status in the second manifest corresponding to the same data object identifier.

7. The system of claim 5, wherein the comparison is based at least in part on comparing a hash value of a data object in the first set of data objects with a hash value of a corresponding data object in the second set of data objects.

8. The system of claim 5, wherein:
at least one of the first manifest and the second manifest includes, for each data object of the first set of data objects, integrity information corresponding to the data object; and
the comparison is performed based at least in part on the integrity information.

9. The system of claim 5, wherein the memory further stores computer-executable instructions that, if executed, cause the one or more processors to provide the data indicating the subset of the first set of data objects to the first location over a network in response to one or more calls to an application programming interface.

10. The system of claim 5, wherein the first set of data objects are encrypted data objects encrypted using a first cryptographic key and the second set of data objects comprise plaintext data objects decrypted from the first set of data objects using a second cryptographic key, the second cryptographic key associated with the first cryptographic key.

11. The system of claim 5, wherein:
the first manifest includes, for each data object of the first set of data objects written to the data transfer device, first integrity information of the corresponding data object written to the data transfer device;
the second manifest includes, for each data object of the second set of data objects written to the data storage service, second integrity information of the corresponding data object written to the data storage service; and
the comparison is performed based, at least in part, on the first integrity information and the second integrity information.

12. The system of claim 5, wherein the memory further stores computer-executable instructions that, if executed, cause the one or more processors to provide data indicating the subset of the first set of data objects to the first location in response to the comparison determining another subset of the first set of data objects not included in the second set of data objects.

13. A non-transitory computer-readable storage medium having stored thereon executable instructions that, as a result of being executed by one or more processors of a computer system, cause the computer system to at least:
receive, at a second location, a first manifest that inventories a first set of data objects transferred to a data transfer device transported from a first location to the second location, the first manifest generated at the first location;
perform, at the second location, a comparison between the first manifest and a second manifest that inventories a second set of data objects written to a data storage service from the data transfer device, the second manifest generated at the second location;
perform, at the second location, a set of delete operations to remove the second set of data objects from the data transfer device in response to the comparison; and
transmit, to the first location, information indicating the second set of data objects.

14. The non-transitory computer-readable storage medium of claim 13, wherein the data transfer device is a member of a cluster of data transfer devices, and the instructions further comprise instructions that, as a result of being executed by the one or more processors, cause the computer system to:
write the second set of data objects to the data storage service according to a set of instructions specifying one or more data objects to be transferred from the cluster of data transfer devices.

15. The non-transitory computer-readable storage medium of claim 13, wherein the instructions that cause the computer system to perform the comparison further include instructions that cause the computer system to compare integrity information specified in the first manifest with integrity information specified in the second manifest.

16. The non-transitory computer-readable storage medium of claim 13, wherein the instructions that cause the computer system to perform the set of delete operations further include instructions that cause the computer system to at least temporarily prevent removal of data from the first set of data objects not included in the second set of data objects from the data transfer device based at least in part on the comparison.

17. The non-transitory computer-readable storage medium of claim 13, wherein the instructions that cause the computer system to perform the comparison further include instructions that cause the computer system to perform the comparison based at least in part on first metadata indicated in the first manifest and second metadata indicated in the second manifest, wherein the comparison determines, at least in part, that the first metadata matches the second metadata.

18. The non-transitory computer-readable storage medium of claim 13, wherein the executable instructions further include executable instructions that, as a result of being executed by the one or more processors, cause the computer system to transmit the information to the first location in response to one or more requests to an application programming interface received from the first location, the application programming interface provided, at least in part, by a computing resource services provider at the second location.

19. The non-transitory computer-readable storage medium of claim 13, wherein the executable instructions that cause the computer system to transmit the information to the first location further include executable instructions that, as a result of being executed by the one or more processors of the computer system, cause the computer system to transmit the information to the first location over a network.

20. The non-transitory computer-readable storage medium of claim 13, wherein information indicates the second set of data objects copied from the data transfer device to the data storage service and removed from the data transfer device.

* * * * *